United States Patent [19]

Leuchter, Jr.

[11] 4,339,198

[45] Jul. 13, 1982

[54] GEODETIC INSTRUMENT

[75] Inventor: Fred A. Leuchter, Jr., Malden, Mass.

[73] Assignee: Celenav Industries, Inc., Malden, Mass.

[21] Appl. No.: 46,264

[22] Filed: Jun. 7, 1979

Related U.S. Application Data

[63] Continuation of Ser. No. 805,750, Jun. 13, 1977.

[51] Int. Cl.$^3$ .............................................. G01C 1/00
[52] U.S. Cl. .................................. 356/144; 356/140; 250/231 SE; 250/237 G
[58] Field of Search ............... 356/140, 141, 144, 138; 250/231 SE, 237 G; 33/1 D, 1 N, 1 T, 1 PT, 267, 268, 282

[56] References Cited

U.S. PATENT DOCUMENTS

| | | | |
|---|---|---|---|
| 2,338,325 | 1/1944 | Friar | 356/145 |
| 2,463,649 | 3/1949 | Sheffield | 33/1 D |
| 3,524,067 | 8/1970 | West | 250/237 G |
| 3,531,650 | 9/1970 | Cronin | 250/237 G |
| 3,752,591 | 8/1973 | Feldman | 356/140 |
| 3,770,970 | 11/1973 | Trump | 250/237 G |
| 3,842,261 | 10/1974 | MacGovern et al. | 250/237 G |
| 3,968,570 | 7/1976 | Leuchter | 356/140 |
| 4,101,882 | 7/1978 | Kramer | 250/231 SE |

FOREIGN PATENT DOCUMENTS 1175475 12/1969 United Kingdom ................ 356/140

Primary Examiner—R. A. Rosenberger
Attorney, Agent, or Firm—Donald Brown

[57] ABSTRACT

The combination with a sextant embodying an index mirror rotatable about a predetermined axis to bring a sighted object into juxtaposition with the line of sight of the optical system at the center of the horizontal mirror of an arcuate informational grating concentric with the axis of rotation of the index mirror and an index arm rotatable in consonance with the index mirror so that its distal end travels along the informational grating, a reference grating at the distal end of the index arm concentric with the information grating, a light-emitting diode at the proximal end of the index arm arranged to project a beam through the reference grating at the distal end of the arm onto the informational grating and a phase detector arranged at the proximal end of the index arm to receive the beam reflected from the conjuncted gratings. There is an index lever for rotating the index mirror and index arm in unison and a friction element at the distal end of the index lever for positioning it at a predetermined position.

5 Claims, 7 Drawing Figures

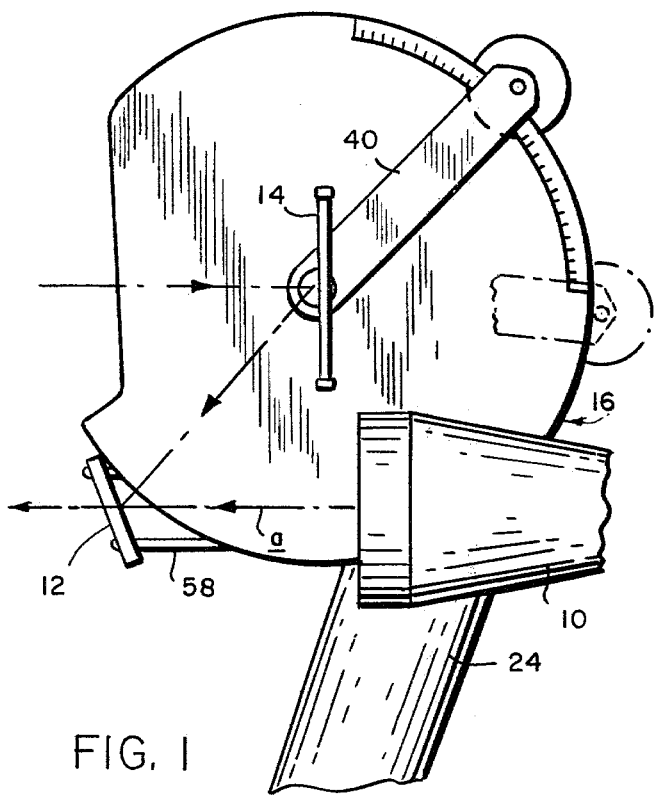
FIG. 1
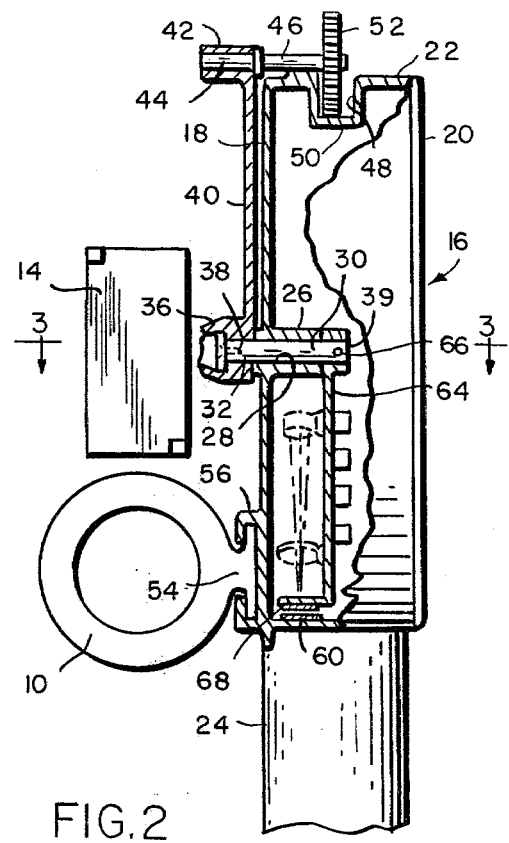
FIG. 2
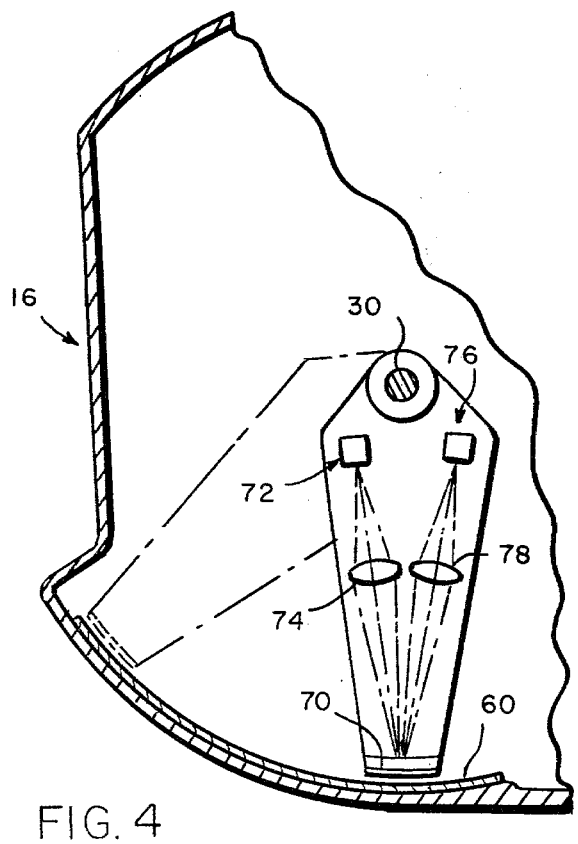
FIG. 4
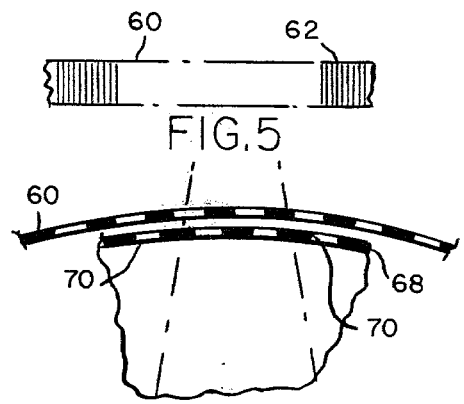
FIG. 5
FIG. 6
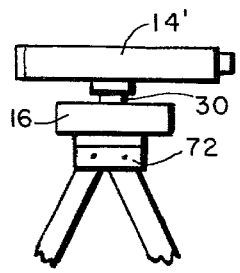
FIG. 7

GEODETIC INSTRUMENT

This is a continuation, of application Ser. No. 805,750 filed June 13, 1977.

BACKGROUND OF THE INVENTION

At the present time, the most accurate measuring techniques in portable instrumentation are variations of the Vernier technique. This perhaps reaches its greatest development in the marine sextant, wherein a gear sector is traversed by a worm gear on an arm pivoted at the center of the sector. The angular position of the worm gear is read out by a Vernier. The maximum readout is in the order of 0.02 arc minutes while the overall system accuracy at room temperature is in the order of 18 arc seconds due to the eccentricity of the arc. Such a gear sector typifies the limits of gear hobbing technology and constitutes a heavy, expensive, delicate scale for analog readout of shaft position (in the case of the sextant, of the elevation of the index mirror).

The goal which led to the development of the present instrument was to derive a means for reading out the index mirror limitation by an inexpensive, mass-producible, rugged lightweight, electro-optical means suitable for replacing the sector gear with a readout in electrical signals, suitable for electronic display and computer-compatible.

Commercial shaft encoders are operated by Moire technique, and are limited by defraction to something of the order of 100 line pairs per millimeter. Additionally, these are intended to measure 160 degrees and greater, whereas for geodetic measurements, horizon-to-zenith measurement is required. To achieve a design goal of ±3 arc sec. revolutions (6 arc seconds between counts) with quadrature, some 64,000 line pairs are required. This implies the use of a Moire encoder sector of some 25 inches in radius.

The sector encoder for geodetric instruments herein disclosed has five important advantages:

1. The informational and reference gratings are made flat, which lends itself to fabrication by conventional linear fabrication techniques. It is made on a flexible substrate such that it may be bent around and affixed to an arcuate cylindrical mandrel. Cylinders of revolution may be fabricated to extremely close tolerance by ordinary machine shop practices; so that the resultant assembly yields a cylindrical scale which can be accurately divided into equal angular measurements, while bypassing the extremely complex fabrication of dividing an arcuate scale in place.

The substrate of the scale is matched to the sector mandrel in thermal expansion, such that the scale varies only in radius over temperature extremes, maintaining its angular fidelity. In a reflective embodiment, the scale substrate and mandrel may be made of, for example, aluminum. In a transmissive embodiment, the scale substrate may be thin glass sheet (such as Corning Co.'s "Microsheet") on a stearite, glass, or alumina substrate.

2. While avoiding the cost and weight of a hobbed gear sector, an increase in accuracy is obtained. The 6 inch radius gear sector is capable in production of maintaining a readout accuracy within 18 arc seconds. Assuming 50,000 counts per inch (as described below), the optical readout device (due to its linear perfection in the flat, the extreme circulatory, conventionally readily available with lathe machining, and the assembly techniques described below), utilizing the same radius would have a readout accuracy within 1.5 arc seconds (±0.75 arc seconds.

3. The readout, summed in an electronic computation stage, directly yields a computer-compatible signal for further processing, reading the sector rotation from some assigned "null" position.

4. The readout utilizes an easily mass-produced linear grating, an inexpensive optical collimetric chain, and a low-cost light-emitting diode and detector pair. Utilization of a reference grating rather than a single slot or pinhole in the input beam permits use of an LED rather than an expensive and cumbersome gas or diode laser. As well, the grating may be divided into two sections, 90 degrees out of phase in spatial frequency to yield a quadrature signal, with 4× to 12× multiplication of sensitivity.

5. Finally, the entire readout mechanism uses only low voltage (1.5-3 volts) at moderate currents (25 to 100 ma), making it eminently suitable for hand-held, small, battery-powered instrumentation.

SUMMARY OF THE INVENTION

A sextant comprising in combination with an index mirror rotatable about a predetermined axis to bring a sighted object into juxtaposition with the line of sight of the optical system of the sextant at the center of the horizontal mirror; an arcuate member concentric with the axis of rotation of the index mirror, an index arm movable in consonance with the index mirror about said axis such that the distal end of the arm travels along said arcuate member in an arc concentric with the arc of the arcuate member and means on the index arm and the arcuate member operable by relative movement of the index arm as the index mirror is rotated to translate the angular movement of the index arm into degrees, minutes, and seconds. The arcuate member comprises an informational grating and there is an arcuate part at the distal end of the index arm having the same radius of curvature as the arcuate member and concentric with the arcuate member comprising a reference grating. The means for producing a signal comprises in combination with the gratings a light source at the proximal end of the index arm arranged to direct a beam through the slots in the grating at the end of the index arm and onto the grating on the support and a receiver at the proximal end of the index arm arranged to receive the reflection of the beam. The light source is a light-emitting diode, the receiver a phase detector, and there are optical elements arranged on the index arm for gathering and focusing the directed beam onto the gratings and the reflected beam onto the receiver. There is a support structure provided with a handle for holding the device in an appropriate position for sighting; the horizontal mirror and optical system are mounted on the support such that the line of sight of the optical system passes through the center of the horizontal mirror, and a shaft on the support mounts the index mirror for rotation about an axis parallel to the surface of the horizontal mirror and perpendicular to the line of sight. The index arm is fixed at one end to the shaft and there is an index lever fixed to the other end of the shaft by means of which the index mirror and the index arm may be moved in unison. There is means at the distal end of the index lever for indexing the index lever angularly comprising a part rotatable about an axis parallel to the shaft and an arcuate track on the support, the axis of which coincides with the axis of rotation with which said part has rolling frictional engagement.

The invention will now be described with reference to the accompanying drawings, wherein:

FIG. 1 is an elevation of the sextant of this invention with portions of the optical system and the handle broken away;

FIG. 2 is an elevation partly in section as viewed from the right side of FIG. 2;

FIG. 4 is a fragmentary section to a much larger scale taken on the line 4—4 of FIG. 2;

FIG. 5 is a plan view of a fragmentary portion of the informational grating;

FIG. 6 is an enlarged section of the informational grating and of the grating at the distal end of the index arm showing their relation to each other; and FIG. 7 is an elevation showing the instrument used for making geodetic measurements, for example, in the form of a transit.

Figure 3:
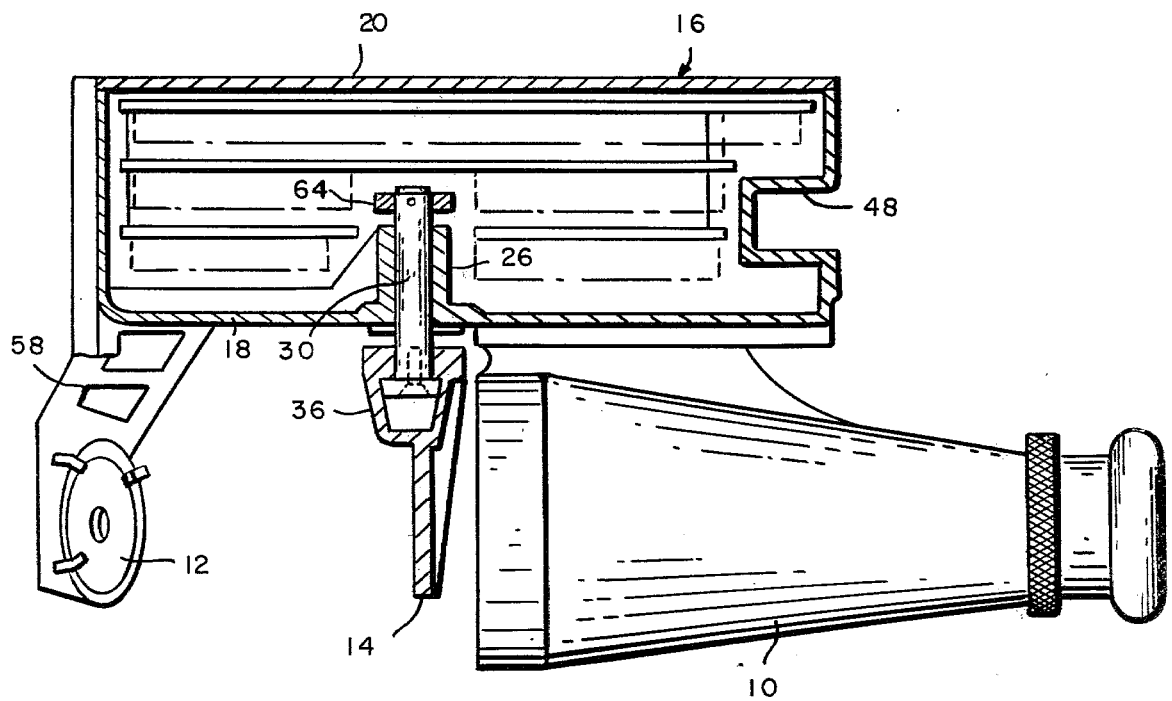
FIG. 3 is a section taken on the line 3—3 of FIG. 2.

Schematically, the device, FIG. 4, comprises a light-emitting diode arranged (with amplifying optics, if necessary) to illuminate both gratings 60 and 70. The reference grating 70 is passed over the informational grating 60 in a manner to obtain a Moire pattern. The light/dark Moire change is seen at the phase detector and the direction is determined by whether a light is preceded by a dark or vice versa.

The sector itself is assembled by gluing a flexible substrate with the informational grating 60 on it, onto an accurately machined arc. The tolerance on the arc radius is that on the acceptable angular error, for example, one part in 64,000. On a 3 inch radius arc, there is a tolerance of some 60 microinches obtainable in production. Glue shrinkage prohibits bedding the substrate in glue, hence, the bedding is done at the edges of the substrate. The cross section of the sector has two glue channels (for example, 0.0002 inches deep) at the side, and a broad land in the center which provides the direct mating surface. The preferred embodiment described incorporates a transmissive reference grating 70 for readout.

Specifically, the invention as illustrated in FIG. 1 is embodied in a sextant which includes, in conjunction, an optical system 10, a horizontal (horizon) mirror 12, and an index mirror 14 so arranged that the line of sight of the optical system passes through the center of the horizontal mirror 12 and that the index mirror can be rotated so as to reflect an image of a sighted object onto the horizontal mirror at the intersection of the line of sight of the optical system with the center of the horizontal mirror. Such an arrangement is typical of any conventional sextant.

The frame of the sextant is in the form of a drum 16, FIG. 2, having spaced, parallel, generally circular end walls 18 and 20 joined by a cylindrical side wall 22. A handle 24 is connected to the side wall 22 at the lower side, as shown in FIGS. 1, 2 and 3, the axis of which is inclined forwardly with respect to the rearside of the instrument at an angle of approximately 60 degrees to the horizontal to enable easily holding the instrument up to the eye of the observer.

The end wall 18, FIG. 2, contains at its center an integral, inwardly-extending, hollow bearing member 26 containing a bearing opening 28 within which there is rotatably mounted a shaft 30 with one end 32 extending outwardly from the end wall 18 and the other end 34 extending inwardly. This is, in effect, a commonly known sextant center. A hub 36 mounts the index mirror 14 to the outwardly extending end 32 of the shaft 30, the hub being keyed to the shaft by means of a key 38 so that it rotates with the shaft. The hub 36 has an integral lever arm 40 extending radially therefrom at the distal end of which there is a bearing element 42 containing an opening 44, the axis of which is parallel to the axis of the shaft 30. A spindle 46 is rotatably mounted in the opening 44 so as to project inwardly from the arm.

The cylindrical side wall 22 contains throughout an arcuate position thereof a channel-shaped groove 48, FIG. 3, having an arcuate bottom wall 50. A knurled wheel 52 is fixed to the inner end of the spindle 46 so as to be situated within the channel with its knurled edge in rolling engagement with the arcuate bottom wall 50. The wheel 52 provides for fine adjustment of the arm 40 and, hence, the index mirror 14.

The optical system 10 comprises a conventional four power Galilean telescope which is attached to the side of the wall 17 by dovetailing. The component parts 54 and 56, FIG. 2, are slidably interengaged and held engaged by a set screw, not shown, so that the line of sight indicated by the line a, FIG. 1, is horizontal when the instrument is held in the grasp of the user's hand and passes through the center of the horizontal mirror 12, the latter, of course, having a clear spot at its center.

The horizontal mirror 12 is mounted by means of suitable brackets 58 to the end wall 18 at an appropriate angle with its mirror surface facing the telescope at an angle of approximately 20 degrees.

In accordance with this invention, the inner side of the side wall 22 which is concavely arcuate and concentric with the axis of the shaft 30 has secured to it a member 60, FIGS. 2, 4 and 5, which takes the arcuate configuration of the inside of the side wall 22 and, hence, is concentric with the axis of the shaft 30. The surface of the member 60 has inscribed on it a plurality of transversely-extending, closely-spaced parallel lines 62 which constitute a linear grating.

An index arm 64, FIG. 2, is rigidly fixed at its proximal end to that portion 39 of the shaft 30 extending into the drum, by means of a pin 66 so that it rotates in consonance with the index mirror 14 when the latter is rotated. At the distal end of the index arm 64, there is an arcuate part 68 which is of the same radius of curvature as the side wall 22 so that it is concentric with the part 60. This arcuate part 68 contains a plurality of closely-spaced, parallel slots 70, FIG. 6, of dimensions corresponding to the lines 62 on the linear grating 60 and, in fact, constitutes a reference grating.

The angular travel of the index mirror is measured by a beam projected onto the gratings 60 and 70 and reflected back to the phase detector, for example, 2 photo transistors as is conventional in the art. The beam is provided by a light-emitting source in the form of a diode (LED). The beam emitted therefrom is focused by means of a lens 74, FIG. 4, mounted on the index arm so as to pass through slots in the reference grating 70 onto the informational grating 60 and to be reflected therefrom back through the reference grating 70 to a receiver 76 comprising a phase detector by means of a lens 78.

In operation, the device is held by the handle 20 upright with the eyepiece of the telescope to the eye of the person using the device so that the line of sight of the optical system of the telescope is substantially horizontal directed to a real or imaginary horizon, whereupon the image of the object sighted as received by the index mirror 14 is brought into coincidence with the line of sight of the telescope at the center of the horizontal mirror by rotation of the index mirror 40 and fine adjustment by wheel 52.

There is sufficient frictional engagement between the wheel 52 and the bottom of the channel so that the index mirror 14 can be indexed through small annular distances accurately and, in any given position of adjustment, will remain in that position until manually moved to a different position. During movement of the lever arm 40 to bring the index mirror into the aforesaid collimated position, the index arm 64 moves a corresponding angular distance and, as it is moved relative to the grating 60, signals are produced which are fed into a computer and converted thereby into degrees, minutes, and tenths of minutes; or hours, minutes, and seconds, as may be desired, as per U.S. Pat. No. 3,968,570.

The device as described provides for accurate readout of the relative angular position through a sector of a circle of an optical leg in a geodetic instrument, yielding increased angular resolution at decreased cost, and a digital electrical signal suitable for further electronic processing and digital display; means for accomplishing the above by fabricating an arcuate scale by holographic or other means in the flat and attaching the grating substrate to an accurately (but conventionally) turned mandrel; means for reading out sector positions by reflective or transmission interference phenomena in a conventional Moire technique from an informational grating and a means for utilizing an LED for this readout whereby a reference grating is imaged on the information grating as a multiple slit, enabling a large fraction of the LED power to be utilized in the readout process.

As previously stated, the device may be used for surveying purposes and, for this purpose, may be mounted on a tripod 72 as shown in FIG. 7. FIG. 7 illustrates a use of the device as a transit wherein the drum 16 is mounted on a tripod in a horizontal position with the axis of the shaft 30 vertical and a telescope 14' is substituted for the mirror 14 and is mounted to the shaft 30.

The instrument as thus described is of relatively simple construction and yet has a precision of 0.5 arc seconds and reads to 1 arc second. In the preferred sextant embodiment, the gratings 60 and 70 would have a spatial frequency of 450 lines/MM.

I claim:

1. A geodetic instrument comprising a support, a horizontal mirror and optical system mounted to the support with line of sight of the optical system intersecting the horizontal mirror at its center, an index mirror rotatable about a predetermined axis to bring a sighted object into juxtaposition with the line of sight of the optical system at the center of the horizontal mirror, means defining an arcuate surface concentric with the axis of rotation of the index mirror, an informational grating comprising a strip of flexible sheet material bearing graduations applied thereto while flat, said strip being adhesively attached to said arcuate surface, an index arm movable in consonance with the index mirror about said axis such that the distal end of the index arm travels along said arcuate member in an arc concentric with the axis of the arcuate member, an arcuate reference grating at the distal end of the index arm having the same radius of curvature as the informational grating, a light source mounted at the proximal end of the index arm arranged to direct a beam of light through the slots of the reference grating substantially at the center thereof onto the informational grating at an angle of incidence such as to cause the beam modified by the slots to be reflected at an angle of reflection corresponding to the angle of incidence, and a diode receiver at the proximal end of the arm arranged in the path of the reflected light to receive the beam, said diode being designed to produce a signal indicative of the angular movement necessary to move the image into juxtaposition with the line of sight.

2. A geodetic instrument according to claim 1 comprising a lens system for focusing the beam on the gratings and a lens system for focusing the reflected light on the receiver.

3. A geodetic instrument according to claim 1 wherein the support comprises an enclosure having spaced, parallel side walls and a peripheral wall connecting the side walls, means in one of the side walls defining a bearing sleeve within the enclosure within which the index shaft is rotatably mounted with one end extending from the sleeve into the enclosure and the other end extending from the sleeve out of the enclosure, said index arm being mounted within the enclosure with its proximal end fixed to the index shaft and with its distal end adjacent the peripheral wall, said peripheral wall providing said arcuate surface concentric with the axis of rotation of the index shaft, said arcuate reference grating at the distal end of the index arm being concentric with said arcuate surface and said informational grating being applied to said arcuate surface, an index lever fixed at its proximal end to the end of the index shaft extending from the enclosure for effecting rotation of the index shaft and, hence, the index arm within the enclosure to thus move the gratings relative to each other, said index mirror being fixed at its center to the proximal end of the index lever outside the enclosure for rotation about the axis of the shaft, and said index lever extending radially from the axis of the index shaft parallel to the side wall of the enclosure from which the index shaft projects, means at the distal end of the index lever defining a bearing, the axis of which is parallel to the axis of the index shaft, a shaft rotatably mounted in the bearing with an end extending transversely of the peripheral wall, said peripheral wall containing an arcuate groove centered on the axis of rotation of the index shaft and a knurled wheel fixed to the shaft with its peripheral edge frictionally engaged with the arcuate groove operable by rotation to move the index lever angularly about its proximal end relative to an arcuate scale on said wall centered on the axis of the index shaft and a handle affixed to the peripheral wall below and inclined forwardly with respect to the horizontal line of sight of the optical system.

4. A geodetic instrument comprising a support, an optical system containing a telescope or viewer rotatable about a predetermined axis, means defining an arcuate surface concentric with the axis of rotation of the telescope or viewer, an informational grating comprising a strip of flexible sheet material bearing graduations applied thereto while flat, said strip being adhesively attached to said arcuate surface, an index arm movable in consonance with the telescope or viewer about said axis such that the distal end of the index arm travels along said arcuate member in an arc concentric with the axis of the arcuate member, an arcuate reference grating at the distal end of the index arm having the same radius of curvature as the informational grating, a light source mounted at the proximal end of the index arm arranged to direct a beam of light through the slots of the reference grating substantially at the center thereof onto the informational grating at an angle of incidence such as to cause the beam modified by the slots to be reflected at an angle of reflection corresponding to the angle of incidence and a diode receiver at the proximal end of the arm arranged in the path of reflected light to receive the beam, said diode being designed to produce a signal indicative of the angular movement necessary to move the image into juxtaposition with the line of sight.

5. A device according to claim 4 wherein the device is mounted with the axis of its bearing or pivot vertical for measuring horizontal angles.

* * * * *